United States Patent [19]

Cheung

[11] 3,998,429
[45] Dec. 21, 1976

[54] STRAP TENSIONING TOOL WITH LOAD-SENSING HANDLE
[75] Inventor: Nelson Cheung, Arlington Heights, Ill.
[73] Assignee: Signode Corporation, Glenview, Ill.
[22] Filed: Feb. 19, 1976
[21] Appl. No.: 659,415
[52] U.S. Cl. .................................. 254/79; 254/77; 254/164
[51] Int. Cl.² ......................................... B66F 3/00
[58] Field of Search ............ 254/79, 164, 167, 73, 254/77; 140/93.2; 74/543, 519

[56] References Cited
UNITED STATES PATENTS

| 2,361,224 | 10/1944 | Mars | 254/79 |
| 2,363,328 | 11/1944 | Hofing | 254/79 |

Primary Examiner—Al Lawrence Smith
Assistant Examiner—Robert C. Watson
Attorney, Agent, or Firm—Dressler, Goldsmith, Clement, Gordon & Shore, Ltd.

[57] ABSTRACT

A strap tensioning tool having a feed wheel driven through a tensioning assembly by a load-sensing handle. The feed wheel and tensioning assembly are mounted in a frame for pivotally swinging from a first position in which tension can be drawn on a strap loop by the feed wheel to a second position in which tension cannot be drawn by the feed wheel and whereby the strap can be inserted into, or removed from the tool. The load-sensing handle has a drive lever which is rotated to drive the feed wheel by a handle lever pivotally mounted on the drive lever, whereby the feed wheel can be rotated to achieve a certain predetermined strap tension, after which the handle lever overcomes the force of a biasing means between the handle lever and drive lever and moves relative to the drive lever about the pivotal mount until the handle lever contacts fixed stop means preventing further rotation of the handle lever to thus stop the tensioning action.

10 Claims, 5 Drawing Figures

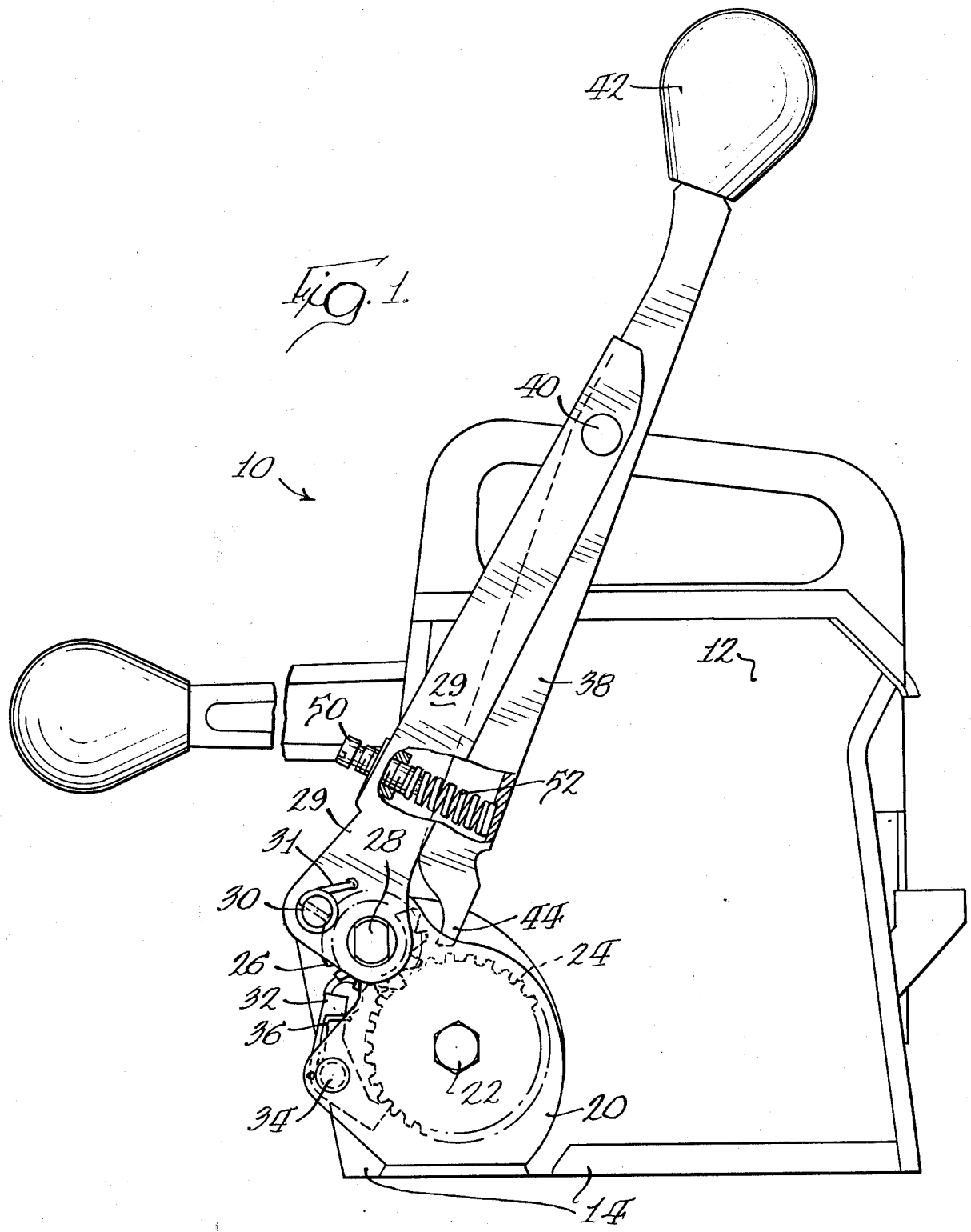

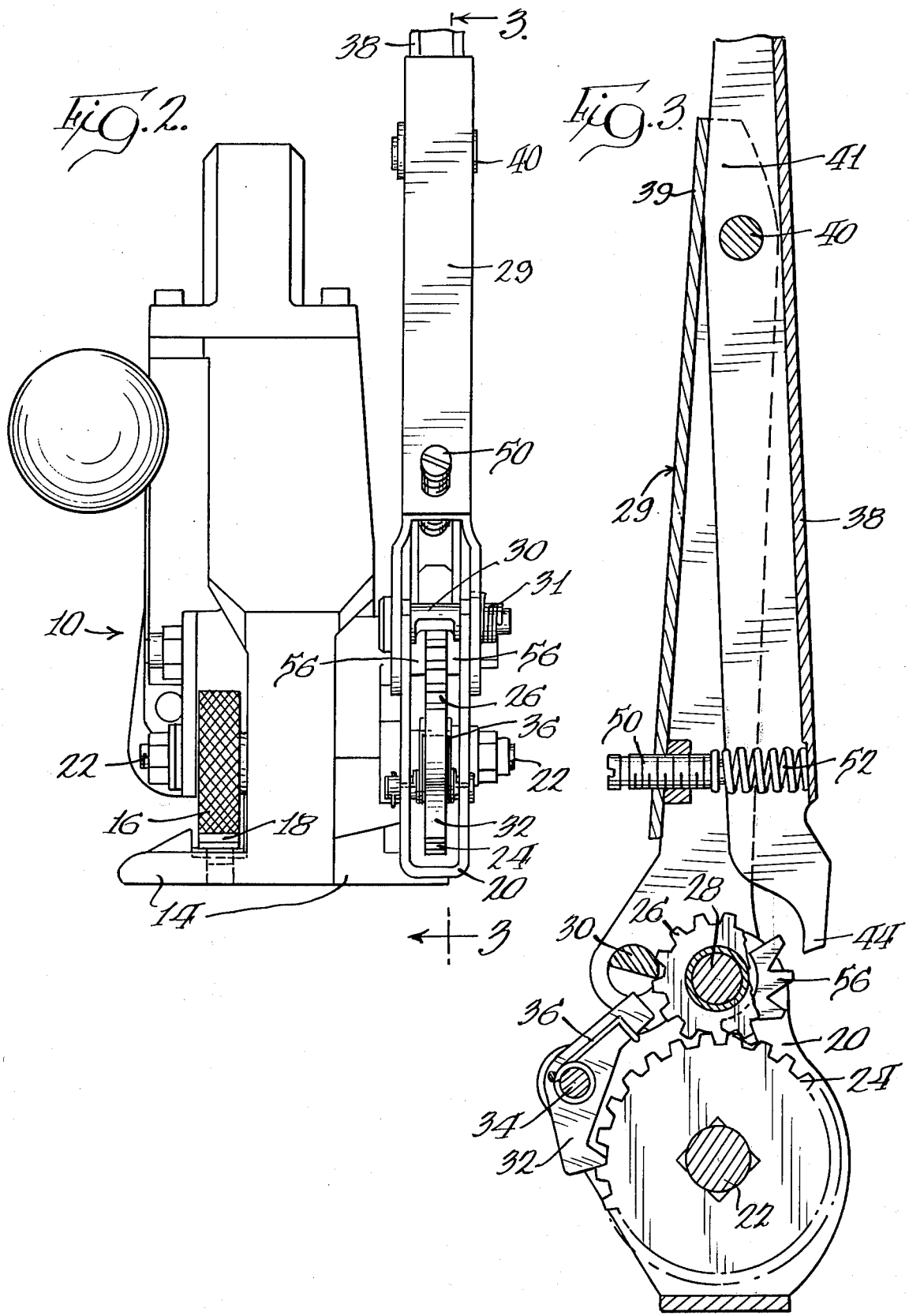

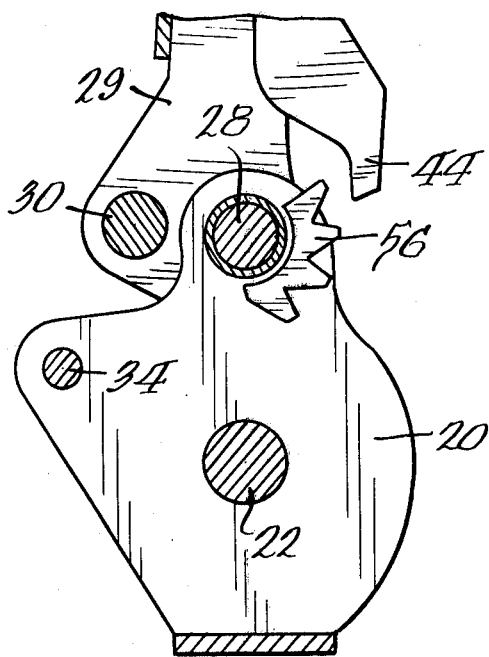
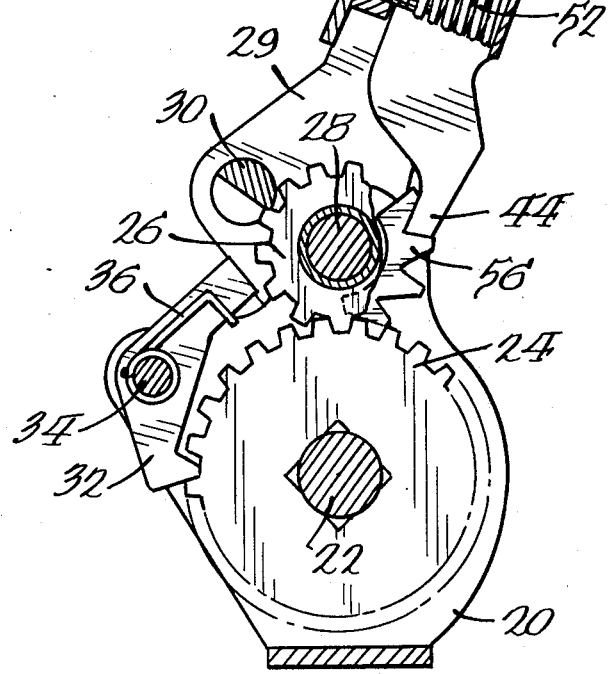

STRAP TENSIONING TOOL WITH LOAD-SENSING HANDLE

BACKGROUND OF THE INVENTION

Strap tensioning tools employed in connection with securing a tensioned strap loop around a package or other object are commonly of the type wherein overlapping ends of the strap loop are engaged respectively by a feed wheel and an adjacent anvil mounted in the base of the tool. Rotation of the feed wheel advances one strap end while the anvil holds the other strap end stationary to tighten the strap loop about a package.

In a common type of strap tensioning tool currently employed, the feed wheel is mounted from a main frame for bodily movement toward and away from the anvil portion to load and release the overlapping strap ends. Normally, this feed wheel is swingably mounted to provide relative movement between the feed wheel and anvil.

The feed wheel is commonly mounted on a drive shaft and the drive shaft is driven through a ratchet and gear transmission assembly from a drive lever mounted on the side of the tool. The drive lever commonly includes a drive pawl which is normally spring-biased to a position for establishing one-way driving engagement with the teeth of a tensioning gear. This creates a drive relation when the drive lever is swung in one direction and allows the drive lever to be swung back without turning the tensioning gear backwards. Further, retaining pawls are provided for maintaining the tensioning gear against reverse rotation. By employing such a ratchet drive mechanism, the drive lever can be worked back and forth, thereby turning the tensioning gear, drive shaft, and feed wheel until the desired strap tension is achieved.

In the strap tensioning tools commonly employed, the tension level must be sensed by the operator of the tool. The operator senses the tension by the increased resistance in drawing the lever in the direction to increase the tension. When the operator determines that he has achieved the desired level of tension, the strap loop is sealed via any of the common methods, such as applying a crimp fold-over type seal to the overlapped strap ends.

There are two problems with such a tensioning procedure. First, the operator does not know at precisely what tension level the tensioning process should be terminated. Secondly, even if the operator knows the level at which tensioning should be terminated, it is difficult for the operator to sense when he has achieved that level of tension in the strap loop. Obviously, it is desirable to avoid overtensioning the strap loop which can cause the strap to break at a sharp corner of a package or article.

Further, even if the strap loop does not break, the level of tension achieved by the operator in each strap loop varies from package to package. Thus, inconsistent results in applying the tension are common.

In some strapping tools, a slip clutch device is employed. This slip clutch device can be set for a particular tensioning level and causes the driving mechanism to slip when that level is reached. Such clip clutch assemblies, however, are not as durable under typical rugged handling and are subject to wear and subsequent malfunction.

SUMMARY OF THE INVENTION

The instant invention is used in a strapping tool having a strap feed wheel mounted to a drive shaft from a main frame above the base of the tool. An anvil is located in the base of the tool below the feed wheel. The feed wheel and anvil are arranged to receive overlapping strap ends of a loop about a package to be tied. The relative space between the feed wheel and the anvil can be varied to permit loading and releasing of the overlapping loop strap ends.

For initially loading the tool, the feed wheel is moved away from the anvil to permit the overlapping loop strap ends to be inserted therebetween. After the strap ends are loaded between the feed wheel and the anvil, a biasing force maintains the feed wheel and anvil against the overlapping ends. The feed wheel is rotated to draw the strap end contacting the feed wheel in a loop tightening direction.

In accordance with this invention, a drive lever is provided to rotate the drive shaft and feed wheel through a transmission gear assembly. Pivotally mounted to the drive lever is a handle lever with a handle on one end and an engaging arm on the other. The handle lever is biased at an angle with respect to the drive lever with a biasing means between the two levers. During the tensioning operation, the operator moves the handle lever back and forth. The biasing means maintains the handle lever and the drive lever is a stationary relative position and thus, any movement of the handle lever moves the drive lever. As the drive lever is thus moved back and forth, rotating about a shaft, the transmission gear assembly drives the drive shaft and feed wheel to rotate the feed wheel in a loop tightening direction. Ratchet mechanisms are employed to prevent a reverse rotation of the drive shaft and feed wheel when the handle and drive lever are moved in the return direction.

Fixed ratchet stop teeth are provided on a housing near the engaging arm of the handle lever. When the handle arm is being moved back and forth to tension the strap loop, the engaging arm is out of engagement of the fixed ratchet stop teeth. However, as the strap loop tension increases, the resistance of the feed wheel and drive shaft to further rotation increases. The increased resistance is felt in the handle lever. When the resistance reaches a certain value as determined by the biasing means, the biasing means between the drive lever and handle lever is overcome, permitting relative rotation between the drive lever and handle lever, whereby the engaging arm moves to contact the fixed ratchet stop teeth. Once the engaging arm has contacted and fully seated within the fixed ratchet stop teeth, further tensioning movement of the handle lever and drive lever is prevented and the tensioning action is terminated.

Thus, this invention provides a means for terminating strap tension at a predetermined level. This prevents damage to the container or package being tied with a strap loop and prevents possible strap breakage at sharp corners of the package or container.

The biasing means between the drive lever and handle lever can be adjustable for allowing varying predetermined strap loop tension levels to be set on the tool.

With this invention, the operator can produce consistent tensioning results and saves time in the tensioning operation because he does not have to slow down movement of the handle lever to "feel" the tension in the strap loop.

While a major objective of this invention is the automatic termination of the tensioning process at a predetermined and set level of strap tension, it is also possible with this invention to tension a strap loop with small increments of tension beyond the predetermined set point. Since the handle lever movement in the tensioning direction is terminated when an engaging arm seats in a fixed ratchet stop tooth assembly, further tensioning is possible by moving the handle lever to the return position and then moving the handle lever back in the driving direction until the engaging arm again contacts and seats within one of the teeth of the fixed ratchet. Since this ratchet consists of a number of separate teeth, the amount of tensioning that can be achieved once the tensioning limit has been reached is limited by ratcheting the handle and drive lever one tooth at a time.

Numerous other advantages and features of the present invention will become readily apparent from the following detailed description of the invention and of one embodiment thereof, from the claims, and from the accompanying drawings.

BRIEF DESCRIPTION OF THE DRAWINGS

In the accompanying drawings forming part of the specification, and in which like numerals are employed to designate like parts throughout the same, FIG. 1 is a side elevational and partial cut-away view of the relevant parts of the strap tensioning tool shown equipped with a load-sensing tensioning handle assembly constructed in accordance with this invention;

FIG. 2 is an end view of the strap tensioning tool shown in FIG. 1, but with the tensioning handle assembly in a vertical orientation;

FIG. 3 is an enlarged sectional view of the tensioning handle assembly taken along a line 3—3 of FIG. 2;

FIG. 4 is a partial sectional view of the lower portion of the tensioning handle assembly shown in FIG. 3 and with the tensioning pinion, retaining pawl, and tensioning gear removed; and FIG. 5 is a partial sectional view of the tensioning handle assembly shown in FIG. 3, but with the tensioning handle rotated and engaged with the stop teeth.

DESCRIPTION OF THE PREFERRED EMBODIMENT

Referring now to the drawings, in FIG. 1, the relevant elements of a typical strapping tool 10 are shown. The particular tool shown herein for purposes of illustrative disclosure corresponds generally to the tool shown in U.S. Pat No. 3,360,017, issued to Ilmar J. Vilcins, and assigned to the assignee of the present invention, and reference may be made to that patent for further details concerning the strap tensioning tool generally designated as 10 in FIG. 1.

The tool includes a main frame 12 having an elongated base 14 shown disposed horizontally. In use, this base 14 is set upon a package to be tied and a strap is looped about the package. Opposite ends of the loop are then overlapped and would extend along the top of the base underneath a feed wheel 16 and over an anvil 18 shown in FIG. 2.

For initially loading the tool, the feed wheel must be moved away from the anvil to permit the overlapping loop strap ends to be inserted therebetween. This is accomplished by commonly supporting the feed wheel and its gear transmission and lever assembly (hereinafter described) for swinging upward and away from the anvil. In FIG. 2, a gear housing 20 supports a feed wheel drive shaft 22 and gear transmission and lever assembly. The gear housing 20 is itself pivotally mounted about a pinion shaft 28 for swinging arcuately upward in a counterclockwise direction, as viewed in FIG. 1. A tensioning drive lever 29 is shown in FIG. 2 with a bifurcated drive end flanking the gear housing 20 and journaled about the pinion shaft 28. As shown in FIG. 3, a drive pawl 30 (described in more detail hereinafter) is mounted in the bifurcated drive end of the drive lever 29. A retaining pawl 32 is mounted on a shaft 34 in the gear housing 20 below the drive lever 29. Counterclockwise rotation of the drive lever 29 beyond a certain point causes the drive pawl 30 to contact the back side of the retaining pawl 32, which butts against a tensioning gear 24 on the drive shaft 22. Since the drive shaft 22 is mounted in the gear housing 20, the drive lever 29 and the gear housing 20 become "locked" together for swinging the gear housing 20 in the counterclockwise direction about pinion shaft 28. This movement carries the feed wheel drive shaft and feed wheel 16 upward and away from the upwardly facing surface of the anvil region 18. With the feed wheel 16 swung away from the anvil 18, the overlapping loop strap ends can be inserted underneath the feed wheel 16 for initial strap loading of the tool.

After the overlapping loop strap ends have been inserted into the tool, the tensioning process is accomplished by maintaining the feed wheel against the overlapping strap ends and rotating the feed wheel through a gear transmission by back and forth movement of a drive lever 29 via handle 42, as depicted in FIG. 1. A spring-biasing means, not shown, maintains the feed wheel 16 against the overlapping strap ends and impresses the strap ends between the feed wheel 16 and anvil 18. Rotation of the feed wheel 16 draws the upper strap end in contact with a feed wheel in a loop tightening direction. The drive shaft 22 and the feed wheel 16 are rotated by the tensioning gear 24 located in the gear housing 20. In FIG. 3, the tensioning gear 24 is shown engaging a tensioning pinion 26 which rotates about the pinion shaft 28. The drive pawl 30, located on the drive lever 29, engages the tensioning pinion 26. The drive pawl 30 is biased clockwise by a drive pawl spring 31 to engage the teeth of the tensioning pinion 26 as shown in FIGS. 2 and 3. The drive pawl spring 31 allows the drive lever 29 to be rotated in a clockwise direction about pinion shaft 28 to rotate the tensioning pinion 26 clockwise, as viewed in FIG. 3. Rotation of the drive lever 29 in the counterclockwise direction, as viewed in FIG. 3, will cause the drive pawl 30 to become disengaged from the teeth of the tensioning pinion 26 and will allow the drive lever 29 to be returned in the counterclockwise direction without reverse driving the tensioning pinion 26 in the counterclockwise direction.

The retaining pawl 3, mounted on the retaining pawl shaft 34 through the gear housing 20, is biased by a retaining pawl spring 36 in a counterclockwise direction as viewed in FIG. 3 to engage the teeth of the tensioning gear 24. The retaining pawl 32 prevents any clocking rotation of the tensioning gear 24 while permitting counterclockwise rotation.

It can be seen that clockwise rotation of the drive lever 29, as viewed in FIGS. 1 and 3, moves the drive pawl 30 in a clockwise direction to engage the teeth of the tensioning pinion 26 and to rotate the tensioning pinion in a clockwise direction about the tensioning pinion shaft 28. The teeth of the tensioning pinion 26 engage the teeth of the tensioning gear 24 and rotate the tensioning gear 24 in a counterclockwise direction, thus rotating the drive shaft 22 and the feed wheel 16 to draw tight the strap loop. The tension in the strap exerts a reaction force on the feed wheel 16 which, if unopposed, would tend to rotate the drive shaft 22 in the opposite, clockwise direction. The clockwise rotation of the tension gear 24 is prevented by the retaining pawl 32 engaging the teeth of the tensioning gear 24.

In accordance with this invention, a load-sensing handle mechanism is provided to automatically terminate the tensioning process after a preset tension level has been reached. In FIG. 1, a handle lever 38 is shown pivotally mounted at a handle lever pivot shaft 40 on the drive lever 29. On the upper end of the handle lever 38 is a handle 42 and on its lower end is an engaging arm 44. The handle lever 38 and the drive lever 29 are thus mounted together in a scissors-like fashion, but are maintained apart at an angle by a biasing means comprising an ajusting screw 50 and bias spring 52 as shown in FIG. 1 and FIG. 3. The bias spring 52 is adjusted with the adjusting screw 50 to set a predetermined amount of preloaded compression. This preload, regardless of amount, acts on the handle lever 38 to rotate it about the handle lever pivot shaft 40 in a counterclockwise direction (as viewed in FIG. 3), thereby forcing the edge 41 of the handle lever 38 into abutment with the front stop member 39 of the drive lever 29. In this abutting position, the engaging arm 44 is thus located at some distance beyond, and away from, fixed, ratchet stop teeth 56, as shown in FIG. 3. The preload on the bias spring 52 holds the drive lever 29 and handle lever 38 in the abutting relationship shown in FIG. 3 so that when the handle lever 38 is rotated by the handle 42, the drive lever 29 is urged to rotate about the pinion shaft 28.

FIG. 4 shows the fixed ratchet stop teeth 56 arranged in a segment of an arc about the pinion shaft 28. The fixed ratchet stop teeth are secured fixedly to the gear housing 20. Teeth 56 are located on each side of the gear housing as shown in the section view of FIG. 2. The engaging arm 44 of the handle lever 38 is bifurcated and each half of the bifurcated engaging arm lies in the tooth plane of the stop teeth 56 on each side of the gear housing 20. With the biasing spring 52 set with a predetermined preloaded compression, the engaging arm 44 is free to rotate about, and out of engagement with, the stop teeth 56, as shown in FIG. 3.

When tensioning a strap loop about a package, the operator grasps the handle 42 of the handle lever 38 and executes back and forth motion with the handle lever. Both the handle lever 38 and drive lever 29 move together in a stationary relative position—being maintained in that position by the bias spring 52. The clockwise motion, as viewed in FIG. 3, of the handle and drive levers 38 and 29 causes the drive pawl 30 to rotate the tensioning pinion 26, which in turn rotates the tensioning gear 24 to drive the feed wheel in one rotary direction to increase the strap tension. After a predetermined level of tension has been reached, the tension resistance in the feed wheel 16 is transmitted through the drive shaft 22 and gears to the drive lever 29 and handle lever 38. The operator must pull harder on the handle 42 to overcome this tensioning resistance. As the operator pulls harder, the bias spring 52 begins to compress. From FIG. 5, it can be seen that as the spring 52 compresses, the handle lever 38 rotates about the handle lever pivot shaft 40 and the bifurcated engaging arm 44 contacts and engages with one of the pairs of ratchet stop teeth 56 fixed to each side of the gear housing 20. This engagement prevents further movement of the handle lever 38 and drive lever 29. At this point, the tensioning process has terminated and the operator knows that the predetermined tension level has been reached, since he can no longer pull the handle lever 38. The strap loop can now be sealed and removed from the tensioning tool.

A feature of this invention permits the predetermined tension level to be set to various values. By adjusting the adjusting screw 50, the pre-compressed bias spring 52 can be further compressed, or conversely, the amount of compression can be reduced. The angle between the drive lever 29 and handle lever 38 remains constant regardless of adjustment of adjusting screw 50 because any amount of compression of the pre-compressed bias spring causes the edge 41 of the handle lever 38 to abut the front stop member 39 of the drive lever 29. The adjustment merely changes the preload on spring 52 which thereby changes the effort required to overcome this spring preload.

If the bias spring 52 is adjusted to a higher preload, then more force on the handle 42 is required to overcome the spring force and compress the spring so that the engaging arm 44 engages the fixed ratchet stop teeth 56. Thus, a higher level of tension would have to be reached in the strap loop before the higher level of force would be exerted on the handle 42. Conversely, by adjusting the adjusting screw 50 in the opposite direction, the biasing spring 52 preload can be decreased. This means that a lower level of tension in the strap loop would cause the handle lever 38 to rotate about the handle lever pivot shaft 40 against the bias spring 52 and bring the engaging arm 44 into engagement with the fixed ratchet stop teeth 56. Of course, the bias spring 52 itself could be replaced with a spring of different stiffness.

The bias spring 52 can be precompressed until it is solid, thereby avoiding or bypassing the tension sensing feature.

Another feature of this invention permits the operator to continue to tension the strap loop beyond the tension level set by the biasing spring 52. This is made possible by the toothed nature of the fixed ratchet stop teeth 56. After the set tension level has been reached and the engaging arm 44 has been engaged and seated in one of the stop teeth 56, it is possible to rotate the handle lever 38 as viewed in FIG. 3, back in the counterclockwise direction taking the engaging arm 44 out of engagement with the pair of stop teeth 56. Then the operator can begin to rotate it clockwise again. There is some small amount of clockwise rotation permitted until the engaging arm 44 again contacts and seats against the stop teeth 56. The amount of rotation allowed at this point corresponds to one stop tooth engagement distance. Thus, additonal small increments of tension can be pulled by "pumping" the handle back and forth one stop tooth at a time.

It is to be understood that no limitation with respect to the specific apparatus illustrated herein is intended or should be inferred. For example, the bias spring 52 could be in the form of a torsion spring acting between the drive lever 29 and handle lever 38 about the handle lever pivot shaft 40. Also, the adjusting screw 50 and bias spring 52, as depicted in FIG. 3, could be located above the handle lever pivot shaft 40 between that shaft and the handle 42.

Another embodiment of the invention could include a different structural relationship between the drive lever 29 and the handle lever 38. The shape of the edge 41 of the handle lever 38 could be different from that shown in FIG. 3 to permit a lesser or greater included angle of response between the two levers. Also, in another embodiment, the drive lever could be constructed without the front stop member 39 (shown in FIG. 3). In this case, the bias spring 52 would not be susceptible to being set with any preloaded compression because the bias spring would rotate the handle lever 38 about shaft 40 until the bias spring reached its neutral, uncompressed length. Thus, the inclined angle of repose between the drive lever 29, and handle lever 38 could be changed by adjusting screw 50.

For instance, by adjusting the adjusting screw 50, the biasing spring 52 could be pushed further away from the drive lever 29 thereby pushing the handle lever 38 further away. Then more force on the handle 42 is required to overcome the spring force and compress the spring a greater amount so that the engaging arm 44 engages the fixed ratchet stop teeth 56. Thus, a higher level of tension would have to be reached in the strap loop before the higher level of force would be exerted on the handle 42. Conversely, by adjusting the adjusting screw 50 in the opposite direction, the biasing spring 52 and handle lever 38 could be brought closer to the drive lever 29. This means that a lower level of tension in the strap loop would cause the handle lever 38 to rotate about the handle lever pivot shaft 40 against the bias spring 52 and bring the engaging arm 44 into engagement with the fixed ratchet stop teeth 56.

From the foregoing, it will be observed that numerous variations and modifications may be effected without departing from the true spirit and scope of the novel concept of the invention. It is, of course, intended to cover by the appended claims all such modifications as fall within the scope of the claims.

What is claimed is:

1. A tensioning assembly for a strapping tool having a main frame and a feed wheel for drawing tension in a strap loop disposed about a package which comprises: a tensioning assembly support mounted on said frame; a first lever pivotally connected to said support; transmission means engageable by said first lever for rotating said feed wheel to tension the strap loop; a second lever pivotally mounted on said first lever; the second lever having a handle on one end and an engaging arm on the other end; stop means on said support adapted to be contacted by said engaging arm for stopping rotation of said second lever; and means for biasing said second lever with respect to said first lever about said pivotal mount to hold said engaging arm out of engagement with said stop means permitting movement of said second lever to move said first lever for rotating said feed wheel, whereby the feed wheel can be rotated to achieve a certain predetermined tension after which the second lever overcomes said biasing force and the engaging arm contacts said stop means to stop the tensioning action.

2. A tensioning assembly as set forth in claim 1, in which said biasing means is adjustable to permit variation of said predetermined tension at which said tensioning action stops.

3. A tensioning assembly as set forth in claim 1, means for mounting said feed wheel and said tensioning assembly on said support with said first lever, and means for pivotally mounting said support to said main frame of said tool for swinging from a first position in which tension can be drawn on said strap loop by the feed wheel to a second position in which tension cannot be drawn by the feed wheel and whereby the strap loop can be inserted into, or removed from, the tool.

4. A tensioning assembly for a strapping tool having a main frame and a feed wheel for drawing tension in a strap loop disposed about a package which comprises: a tensioning assembly support mounted on said frame; a drive lever pivotally connected at one of its ends to said support allowing arcuate swinging thereabout; transmission means engageable by said drive lever for rotating said feed wheel to tension said strap loop; a handle lever, having a handle on one end and an engaging arm on the other end, pivotally mounted on said drive lever in a scissors-like arrangement allowing rotation of said handle lever about said pivotal mount in the plane of rotation of said drive lever; stop means on said support adapted to be contacted by said engaging arm for stopping rotation of said handle lever; and means for biasing said handle lever with respect to said drive lever about said pivotal mount to hold said engaging arm in a stationary position relative to said drive lever and out of engagement with said stop means permitting movement of said handle lever to rotate said drive lever for rotating said feed wheel, whereby the feed wheel can be rotated to achieve a certain predetermined strap tension, after which the handle lever overcomes the force of said biasing means and moves relative to said drive lever about said pivotal mount on the drive lever until said engaging arm moves toward, and contacts, said fixed stop means preventing further rotation of the handle lever to thus stop the tensioning action.

5. A tensioning assembly for a strapping tool having a main frame and a feed wheel for drawing tension in a strap loop disposed about a package which comprises: a gear housing mounted from said main frame and supporting a drive shaft connected to the feed wheel; a tensioning gear mounted on the drive shaft in the gear housing; a tensioning pinion meshing with the tensioning gear and mounted on a pinion shaft in the gear housing; a drive lever pivotally mounted on the pinion shaft; a drive pawl mounted on the drive lever and biased to engage the tensioning pinion; means for mounting said drive pawl on the drive lever to move in a circular arc about said pinion shaft for driving the tensioning pinion in one rotary direction about the pinion shaft; a handle lever pivotally mounted on said drive lever; said handle lever having at one end a handle and at the other end an engaging arm; stop means secured fixedly to said gear housing and adapted to be contacted by said engaging arm for stopping rotation of said handle lever; and means for biasing said handle lever at an angle with respect to said drive lever about said pivotal mount to hold said engaging arm at a pedetermined radius from said pinion shaft and out of engagement with said stop means permitting movement of said handle lever to rotate the drive lever and drive pawl about the pinion shaft to engage and rotate the engaged tensioning pinion for driving the tensioning gear to rotate the drive shaft and feed wheel, whereby the feed wheel can be rotated to achieve a certain predetermined strap tension after which, in response to the resistance in feed wheel rotation from the tension in the strap loop, the handle lever overcomes the force of said biasing means permitting the handle to rotate about said pivotal mount on the drive lever to decrease the angle between the drive lever and handle lever until said engaging arm moves toward said drive lever and contacts said fixed stopping means on said gear housing preventing further rotation of said handle lever to thus stop the tensioning action.

6. A tensioning assembly as set forth in claim 5, in which said means for biasing said handle lever is a resilient member disposed between, and in the plane of rotation of, said drive lever and said handle lever to urge said handle lever to an angled position with respect to the drive lever.

7. A tensioning assembly as set forth in claim 6, in which said resilient member is a coil spring attached on a first end to said drive lever between said pinion shaft and said handle lever pivotal mount, said spring having the second end urged against said handle lever.

8. A tensioning assembly as set forth in claim 7, and an adjusting screw mounted through said drive lever onto said first end of said spring; said screw beng axially adjustable for varying the preloaded compression of said spring.

9. A tensioning assembly as set forth in claim 7, and an adjusting screw mounted through said lever onto said first end of said spring; said screw being axially adjustable for pushing the spring further away from the drive lever, thereby rotating said handle lever about said pivotal mount to a greater angle of repose relative to said drive lever.

10. A tensioning assembly as set forth in claim 5, in which said stop means comprises a segmental arc of ratchet teeth concentric to said tensioning pinion.

* * * * *